(12) United States Patent
Wieczorek et al.

(10) Patent No.: US 11,112,873 B2
(45) Date of Patent: Sep. 7, 2021

(54) METHOD FOR OPERATING A DISPLAY DEVICE FOR A MOTOR VEHICLE AND MOTOR VEHICLE

(71) Applicant: SMR Patents S.à.r.l., Luxembourg (LU)

(72) Inventors: Romeo Wieczorek, Stuttgart (DE); Stefanie Göttlicher, Bruchköbel (DE); Ilka Rötzer, Denkendorf (DE)

(73) Assignee: SMR PATENTS S.À.R.L., Luxembourg (LU)

(*) Notice: Subject to any disclaimer, the term of this patent is extended or adjusted under 35 U.S.C. 154(b) by 0 days.

(21) Appl. No.: 16/623,830

(22) PCT Filed: Jun. 14, 2018

(86) PCT No.: PCT/EP2018/065796
§ 371 (c)(1),
(2) Date: Dec. 18, 2019

(87) PCT Pub. No.: WO2018/234147
PCT Pub. Date: Dec. 27, 2018

(65) Prior Publication Data
US 2020/0310548 A1 Oct. 1, 2020

(30) Foreign Application Priority Data
Jun. 21, 2017 (DE) ...................... 10 2017 113 763.7

(51) Int. Cl.
*G06F 3/01* (2006.01)
*B60K 35/00* (2006.01)
*B60K 37/02* (2006.01)

(52) U.S. Cl.
CPC .............. *G06F 3/017* (2013.01); *B60K 35/00* (2013.01); *B60K 37/02* (2013.01); *G06F 3/012* (2013.01);
(Continued)

(58) Field of Classification Search
None
See application file for complete search history.

(56) References Cited

U.S. PATENT DOCUMENTS

2011/0080490 A1* 4/2011 Clarkson ................... G06T 7/70
348/222.1
2013/0145304 A1* 6/2013 DeLuca .................. G06F 3/013
715/781
(Continued)

FOREIGN PATENT DOCUMENTS

DE 102015122489 A1 6/2016

OTHER PUBLICATIONS

International Search Report dated Aug. 9, 2018 of International application No. PCT/EP2018/065796.
(Continued)

*Primary Examiner* — Matthew Yeung
(74) *Attorney, Agent, or Firm* — Jones Day

(57) ABSTRACT

A method of operating a display device for a motor vehicle having a plurality of display areas includes providing a plurality of non-contact input operations where a first non-contact input operation of a user is detected and verified by a second non-contact input operation of the user in order to select at least one display element on a first display area, and at least one third non-contact input operation of the user is detected.

13 Claims, 3 Drawing Sheets

(52) U.S. Cl.
CPC ........ *G06F 3/015* (2013.01); *B60K 2370/148* (2019.05); *B60K 2370/149* (2019.05); *B60K 2370/1434* (2019.05); *B60K 2370/1464* (2019.05); *B60K 2370/152* (2019.05); *B60K 2370/162* (2019.05); *B60K 2370/77* (2019.05); *B60Y 2400/3015* (2013.01)

(56) References Cited

U.S. PATENT DOCUMENTS

| | | | | |
|---|---|---|---|---|
| 2013/0155237 | A1* | 6/2013 | Paek | G06F 3/0487 348/148 |
| 2013/0207962 | A1 | 8/2013 | Oberdorfer et al. | |
| 2013/0243255 | A1* | 9/2013 | Williams | G06T 7/251 382/103 |
| 2014/0028548 | A1* | 1/2014 | Bychkov | G06F 3/013 345/156 |
| 2016/0116995 | A1* | 4/2016 | Wilson | G06F 3/013 345/157 |
| 2017/0090566 | A1 | 3/2017 | George-Svahn et al. | |

OTHER PUBLICATIONS

Written Opinion dated Aug. 9, 2018 of International application No. PCT/EP2018/065796.

* cited by examiner

METHOD FOR OPERATING A DISPLAY DEVICE FOR A MOTOR VEHICLE AND MOTOR VEHICLE

CROSS REFERENCE TO RELATED APPLICATIONS

This application is a National Stage Entry of International Patent Application No. PCT/EP2018/065796, filed Jun. 14, 2018, which claims the benefit of foreign priority to German Patent Application No. DE 10 2017 113 763.7, filed Jun. 21, 2017, each of which is hereby incorporated by reference in its entirety for all purposes

BACKGROUND

1. Field of the Invention

The present disclosure relates to a method for operating a display device, in particular for a motor vehicle, and a motor vehicle having a control apparatus which is designed to execute such a method.

2. Related Art

An increasing number of electronic (digital) display areas are being installed in modern motor vehicles, which are intended, on the one hand, to replace the traditional analog instrumentation of the motor vehicle and, on the other hand, can provide additional information such as, for example, map views, user interfaces for entertainment and telecommunication systems and the like.

It has been established that the operation of such display areas by traditional input units such as, for example, buttons, joysticks, touchpads or the like, is very complex and can therefore result, on the one hand, in inputting errors by the driver and, on the other hand, brings with it a high distraction risk for the driver.

For this reason, it is desirable to provide non-contact input methods which are as simple as possible. An operating device for a line of vision-dependent gesture control is thus known, for example, from U.S. Pat. No. 9,244,527 B2. The line of vision of the user thereby selects a target unit or a function which is to be affected by a following gesture input.

However, it has been established that pure gesture input can also result in incorrect operations in many cases. In particular, it can happen that random gestures, which are not in themselves intended to be operating inputs, are wrongly recognized as such so that the content of display areas is inadvertently altered by the driver of the motor vehicle. Gesture-based input systems frequently also require a multiplicity of different gestures which are often difficult for the user to remember. This can also result in inputting errors and in the user being distracted.

SUMMARY

A method for operating a display device, in particular for a motor vehicle, which includes a plurality of display areas is therefore delivered, in which a first non-contact input operation of a user is detected and verified by a second non-contact input operation of the user in order to select at least one display element on a first display area; and at least one third non-contact input operation of the user is detected in order to displace the at least one selected display element at least once from the first display area within the first display area or to a second display area.

Thanks to the verification of the first non-contact input operation by the second non-contact input operation it can be ensured that inadvertent inputting errors by the user are reduced or completely avoided. Therefore, a particularly reliable method for operating a display device is created.

It is proposed that a multiplicity of non-contact input operations be provided, wherein the first, second and third non-contact input operations preferably differ from one another and/or can be selected and/or amended by the user.

It is preferable that the non-contact input operations are determined by a characteristic variable for the head of the user, in particular including a line of vision, an eye position, an iris position, a pupil position, a nose position, a posture of the head, a head position, a head orientation and/or a facial expression of the user, or a characteristic variable for the torso of the user, in particular including a bodily posture, a body position, a body orientation, a shoulder position and/or a shoulder orientation of the user, or a characteristic variable for a hand and/or at least one finger of the user, in particular including a gesture, such as a skimming past, approaching, moving away, splaying of fingers, bending of fingers, touching of fingers and/or making a fist and/or a finger and/or hand position and/or finger and/or hand orientation, or a characteristic variable for the mouth of the user, in particular including a movement of the lips, a noise and/or a voice command.

In order to detect the first non-contact input operation, at least one characteristic variable for the head of the user can be detected and, for verification purposes, at least one characteristic variable for the torso of the user can be detected as the second non-contact input operation, or vice versa. In order to detect the third non-contact input operation, at least one characteristic variable for the hand, the finger or fingers, and/or the mouth of the user can be detected.

A line of vision-dependent selection of the at least one display element on the first display area requires minimum activity on the part of the user and is consequently particularly convenient.

According to an example, the gesture control especially serves to perform a predetermined action, namely a displacement. This makes it possible to manage with a few, particularly simple gestures, which are easy to remember for the user. It is also possible to carry out a displacement via multiple display elements by means of multiple gestures, for example by repeated wiping movements of the hand.

The verification of the first input operation, preferably of the line of vision of the user, by the latter's body position or respectively body orientation as a second input operation can ensure that random eye movements (for example a quick sidelong glance at the front-seat passenger) are not already classified as an input operation. This improves the reliability of the operation of the display device.

In a further preferred embodiment, at least one depth image camera, in particular a time-of-flight camera, is used to detect the first and/or second and/or third non-contact input operation(s). In addition to brightness and/or color information, such depth image cameras also provide depth information for each pixel, that is to say a distance of the object assigned to the respective pixel from the camera. In the case of time-of-flight cameras, this is achieved by measuring the light propagation time between a light source, the object and the camera. Of course, other forms of depth image cameras such as, for example, stereoscopic cameras, interferometric cameras, triangulation systems or light field cameras can also be used. By including the depth or respectively distance information in the camera image to be evaluated, both gestures of the user and the latter's body and head position or respectively body and head orientation can be detected in a particularly reliable manner.

It is further preferred if monitors and/or projection screens and/or head-up displays and/or flexible OLED displays and/or liquid crystal displays and/or light-transmitting fabrics and/or light-transmitting films are used as display areas. As a result, the display device can be easily adapted to the internal design of a motor vehicle and can be seamlessly integrated therein. At the same time, it is thus possible to adapt individual display areas specifically to the requirements of a driver or occupant of the motor vehicle.

It is further preferred if display areas are used, which are arranged in an instrument panel and/or on a windshield and/or in a headliner and/or in a central console and/or in a further interior trim part of the motor vehicle. It can thus, for example, be ensured that for each possible line of vision or orientation of the driver, a display area is provided in the driver's field of view so that all of the necessary information can be transmitted to him at any time.

In a further preferred embodiment, the at least one display element is an icon and/or a menu item and/or a total content of the first display area and/or a selected subarea of the first display area. As a result, a multiplicity of different operating actions is made possible on the basis of the same operating method, without the user having to memorize specific gestures for this purpose. This facilitates the operation of the display device.

It is in addition preferred if the brain activity of the user and/or a voice input of the user is/are detected as a further non-contact input operation. This can both be used for a further verification of the operating actions already described, and can also serve to additionally modify the operating actions.

It is preferable that the at least one display element on the first display area is selected if the first and second non-contact input operations are detected within a first interval of time, and/or the at least one selected element is displaced from the first display area within the first display area or to a second display area if the first and/or second non-contact input operation(s) and the third non-contact input operation are detected within a second interval of time. This serves to further reduce incorrect operations.

It is furthermore proposed that the displacement can be cancelled by a fourth non-contact input operation of the user, which preferably differs from the first, second and third non-contact input operations of the user, or by actuating an input apparatus, in particular including a touch panel.

During the displacement of the at least one display element, the same can be enlarged and/or additional information regarding the at least one display element can be displayed and/or it is possible to change to a submenu regarding the at least one display element. As an alternative, during the displacement of the at least one display element, the same can be reduced and/or less information regarding the at least one display element can be displayed and/or the at least one display element can disappear from the line of vision of the user and/or enter the background. This makes it possible to browse or scroll between menu levels, even in a menu hierarchy. Navigation information can, for example, be displayed as a submenu at a selected point in the motor vehicle, via a main menu. Likewise, it is possible to push displays which are not required, for example regarding a telephone directory, during navigating into the background where it does not disturb the user.

Furthermore, a motor vehicle includes a display device with a plurality of display areas and a control apparatus which is configured to perform a method of the type described.

BRIEF DESCRIPTION OF THE DRAWINGS

Preferred embodiments of the present invention are explained in greater detail below by way of example with reference to the drawings, in which.

DETAILED DESCRIPTION

Figure 1:
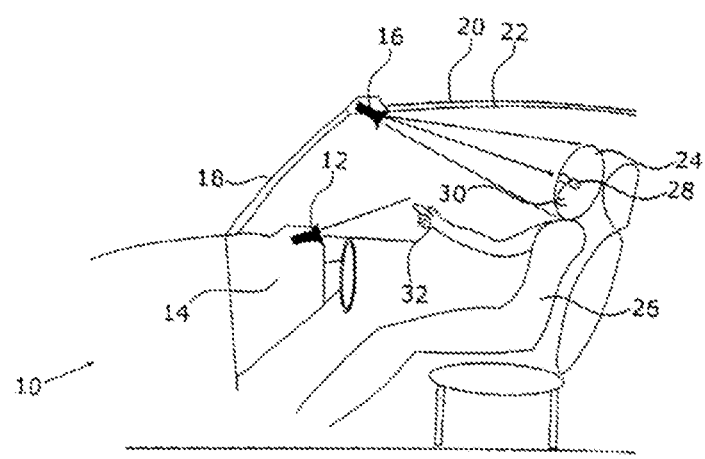
FIG. 1 shows a schematic representation of a motor vehicle which is configured to perform an exemplary embodiment of the method according to the invention.

It is to be understood that the disclosure is not limited in its application to the details of construction and to the arrangements of the components set forth in the following description or illustrated in the drawings. The Figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the Figures and are not intended to limit the scope of the present disclosure. Further, it should be understood that any one of the features may be used separately or in combination with other features. Other systems, methods, features, and advantages will be or become apparent to those skilled in the art upon examination of the Figures and the description. The term "driver" is used throughout this disclosure but is not limited to a person who is operating or controlling the vehicle; it may refer to any vehicle occupant, person, passenger, or user inside the vehicle, or, in certain circumstances, a person who is outside the vehicle but controlling the vehicle or interested in movement of the vehicle. It is intended that all such additional systems, methods, features, and advantages be included within this description, and be within the scope of the present disclosure.

A motor vehicle which is designated in its entirety with 10 includes a first camera 12 which is arranged in an instrument panel 14, and a second camera 16 which is installed at the transition between a windshield 18 and the roof 20 of the motor vehicle 10. The camera 16 can, for example, also be integrated into an internal rearview mirror of the motor vehicle 10.

Furthermore, the motor vehicle 10 includes a plurality of display devices (not represented in FIG. 1), which can be integrated, for example, into the instrument panel 14, can be executed as a head-up display on the windshield 18 or can be installed in a headliner 22 or other interior trim parts of the motor vehicle 10.

In order to make possible a non-contact control of the display devices, e.g. the position of a head 24 of a vehicle occupant 26, of the driver of the motor vehicle 10 in the example shown, is observed with the camera 16. The camera 16 detects, for example, both the eyes 28 of the vehicle occupant 26 and his entire head 24. The position of the eyes 28 can be monitored by image recognition of the eyes 28 as an entirety. However, a more precise analysis can also be performed, in which the position of the pupils or the iris of the eyes 28 is observed. In order to determine the position and orientation of the head 24, the camera 16 can observe parts of the head which are particularly easy to recognize such as, for example, the nose 30 of the vehicle occupant 26.

Furthermore, the further camera 12 in the instrument panel 24 records the position and movement of a hand 32 of the vehicle occupant 26.

The cameras 12, 16 are preferably depth image cameras, particularly preferably so-called time-of-flight cameras which also supply distance information for each pixel so that the image recognition becomes particularly precise.

Figure 2:
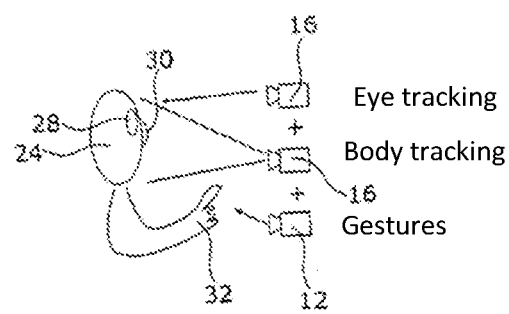
FIG. 2 represents a schematic representation of the detection of non-contact operating actions within the framework of an exemplary embodiment of the method according to the invention.

The combination of the detection of the head position, eye position and gestures of the vehicle occupant 26 makes possible, as explained below with reference to FIGS. 2 to 4, a particularly precise non-contact control of the display device of the motor vehicle 10.

FIG. 2 again summarizes how both gestures and the bodily and head posture or respectively the eye position of the vehicle occupant 26 are detected by means of three cameras 12 and 16. The detection of all of the indicated parameters is particularly advantageous for the described method.

Figure 3:
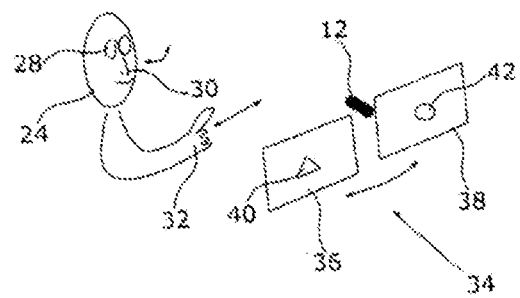
FIG. 3 represents a schematic representation of the performance of an operating action within the framework of an exemplary embodiment of the method according to the invention.
Figure 4:
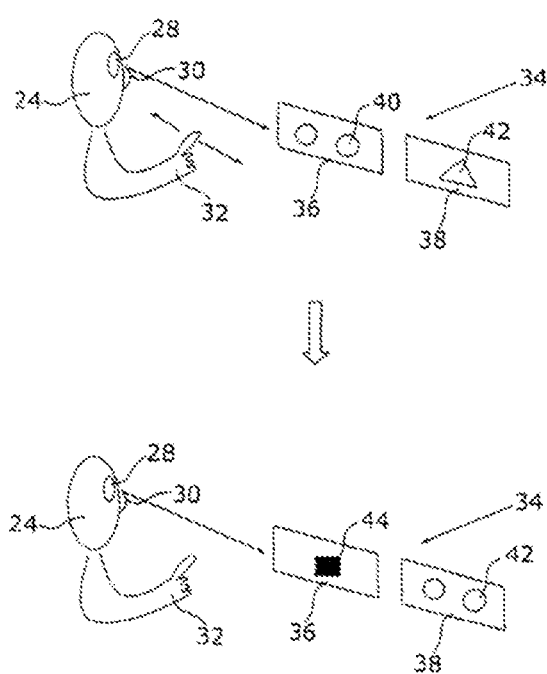
FIG. 4 shows a further schematic representation of the performance of an operating action within the framework of a further exemplary embodiment of the method according to the invention.

FIG. 3 shows how a display device 34 having a first display area 36 and a second display area 38 can be operated. A first display element 40, for example an icon, is arranged on the first display area 36. The second display area 38 shows a second display element 42, in which it can likewise be an icon, a menu item or the like.

If the vehicle occupant 26 then wishes to carry out an operating action, he will first look, for example, at one of the two display areas 36, 38, which is to be the objective of his operating action. He can thus, for example, look at the display area 36 and the line of vision is detected by means of his eye position with a first camera 16. At the same time, it is checked whether the bodily posture of the vehicle occupant 26 coincides with his line of vision in order to verify the recognition of the display area 36 to be selected. To this end, a second camera 16 detects the body orientation. If the vehicle occupant 26 then executes a gesture with his hand 32, which can be detected by the third camera 12, in the example shown a lateral wiping movement between the display areas 36, 38, the display element 40 selected by the look and verified by the body orientation is displaced from the selected display area 36 to the other display area 38.

FIG. 4 shows this again in detail. Here, the entire content of the display area 36 is displaced in the way described by the display area 38, as a result of which a new, predetermined display element 44 is displayed on the display area 36 which is now vacated. A displacement of the entire content of the display area 36 to the display area 38 is, however, not necessarily always the case. It is also possible that only one display element 40, 42, 44 is displaced between the display areas 36, 38 in the way described, or that further actions regarding the selected display element 40, 42, 44 are performed. For example, by displacing an individual icon to a new display area 36, 38, a program associated with said icon can be activated in the newly selected display area 36, 38, or similar further operating functions can be performed. Here, the selection of a menu item, the adjustment of slide controls such as, for example, for the volume of an entertainment system, the selection from a list such as, for example, a list of telephone numbers for an integrated telephone or the like is also conceivable.

To this end, further non-contact inputs can also be detected and evaluated. An additional voice recognition or the recognition of brain activities of the user within the meaning of a brain-machine interface is conceivable, for example.

The features of the invention disclosed in the above description, in the drawings and in the claims can be material, both individually and in any combination, for the realization of the invention in its various embodiments.

LIST OF REFERENCE NUMERALS

Motor vehicle 10
Camera 12
Instrument panel 14
Camera
  1
  6
Windshield 18
Roof 20
Headliner 22
Head 24
Vehicle occupant 26
Eye 28
Nose 30
Hand
  3
  2
Display device 34
Display area 36
Display area 38
Display element 40
Display element 42
Display element 44

What is claimed is:

1. A method of operating a display device for a motor vehicle comprising a plurality of display areas, the method comprising:
  providing a plurality of non-contact input operations, wherein
    first, a first non-contact input operation of a user is detected,
    subsequently, a second non-contact input operation of the user is detected in order to verify the first non-contact input operation,
    in response to the first non-contact operation then the second non-contact operations being detected, at least one display element on a first display area is selected, and
    subsequently, at least one third non-contact input operation of the user is detected, and, in response to the third non-contact input operation being detected after the first and second non-contact operations are detected, the at least one selected display element is displaced within the first display area or to a second different display area, wherein, the first non-contact input operation is at least one characteristic variable for a head of the user and the second non-contact input operation is at least one characteristic variable for a torso of the user, or the first non-contact input operation is at least one characteristic variable for the torso of the user and the second non-contact input operation is at least one characteristic variable for the head of the user, and wherein, the third non-contact input operation is at least one characteristic variable for a hand, finger, fingers, or mouth of the user.

2. The method according to claim 1, wherein the first, second and third non-contact input operations can be at least one of selected or amended by the user.

3. The method according to claim 1, wherein the characteristic variable for the head of the user comprises at least one of a line of vision, an eye position, an iris position, a pupil position, a nose position, a posture of the head, a head position, a head orientation, or a facial expression of the user, the characteristic variable of the torso of the user comprises at least one of a bodily posture, a body position, a body orientation, a shoulder position, or a shoulder orientation of the user, the characteristic variable for a hand or a finger of the user comprises at least one of a gesture such as a skimming past, approaching, moving away, splaying of fingers, bending of fingers, touching of fingers, making a fist, a finger or hand position, or a finger or hand orientation, or the characteristic variable for the mouth of the user comprises at least one of a movement of the lips, a noise, or a voice command.

4. The method according to claim 1, wherein, in order to detect one or more of the first, second or third non-contact input operations, at least one depth image camera or a time-of-flight camera is used.

5. The method according to claim 1, wherein at least one of monitors, projection screens, head-up displays, flexible OLED displays, liquid crystal displays, light-transmitting fabrics, or light-transmitting films are used for the plurality of display areas.

6. The method according to claim 1, wherein the plurality of display areas are arranged in at least one of an instrument panel, a windshield, a headliner, a central console, or in a further interior trim part of the motor vehicle.

7. The method according to claim 1, wherein the at least one display element is at least one of an icon, a menu item, a total content of the first display area, or a selected subarea of the first display area.

8. The method according to claim 1, wherein brain activity of the user is detected as a further non-contact input operation.

9. The method according to claim 1, wherein at least one of the at least one display element on the first display area is selected in response to the first and second non-contact input operations being detected within a first interval of time, or the at least one selected display element is displaced from the first display area within the first display area or to a second display area in response to one or more of the first or second non-contact input operations and the third non-contact input operation being detected within a second interval of time.

10. The method according to claim 1, wherein the displacement is cancelled by a fourth non-contact input operation of the user, which differs from the first, second and third non-contact input operations of the user, or by actuating an input apparatus comprising a touch panel.

11. The method according to claim 1, wherein during the displacement of the at least one display element, at least one of the at least one display element is enlarged, additional information regarding the at least one display element is displayed, or a change is made to a submenu regarding the at least one display element.

12. The method according to claim 1, wherein during the displacement of the at least one display element, at least one of the at least one display element is reduced, less information regarding the at least one display element is displayed, or the at least one display element disappears from a line of vision of the user or enters the background.

13. A motor vehicle comprising a display device with a plurality of display areas;

at least one sensor for detecting a non-contact input operation; and a control apparatus which is configured to perform the method according to claim 1.

* * * * *